Patented July 20, 1954

2,684,370

UNITED STATES PATENT OFFICE 2,684,370

CERTAIN AMINOALKYL-2-THIENYL-CYCLOALKENYL THIOLACETATES

Frederick Leonard, Jackson Heights, N. Y., assignor to Warner-Hudnut, Inc., New York, N. Y., a corporation of Delaware No Drawing. Application July 21, 1951, Serial No. 238,032

4 Claims. (Cl. 260—293.4)

This invention relates to new compounds of pharmaceutical value, particularly as antispasmodics.

In accordance with my invention there are provided compounds having the general structural formula

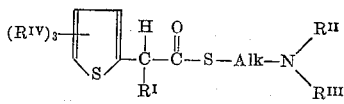

wherein $R^I$ denotes a cyclohexenyl or cyclopentenyl radical; $R^{II}$ and $R^{III}$, which may be the same or different, denote alkyl radicals containing not over 4 carbon atoms, or together denote a polymethylene radical containing not over 5 carbon atoms, and which may be interrupted by an oxygen, sulfur or imino group; $R^{IV}$ denotes hydrogen, a short chain alkyl radical or halogen, which members may be the same or different; and Alk denotes an alkylene radical containing not over 6 carbon atoms and which may be straight chain or branched. These compounds have been found to possess effective antispasmodic activity.

The compounds of my invention may be prepared by reacting an alpha-substituted 2-thienylacetyl halide of the formula:

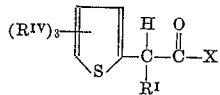

wherein $R^I$ and $R^{IV}$ are as above defined and X denotes halogen, with a mercaptan of the following formula:

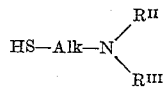

wherein $R^{II}$, $R^{III}$ and Alk are as above defined. This reaction may be conveniently carried out in a suitable solvent such as benzene, under reflux. The thienylacetyl chlorides from which the compounds of my invention are prepared may be readily obtained by treatment of the corresponding alpha-substituted thienylacetic acids with excess thionyl chloride in a suitable solvent such as benzene, under reflux.

The basic esters of my invention are water-insoluble liquids. Water-soluble salts may be formed by treating the free bases with acids such as hydrochloric acid, hydrobromic acid, sulfuric acid, tartaric acid, citric acid or succinic acid, or with suitable organic halides, e. g. alkyl halides such as methyl chloride or methyl bromide, aralkyl halides such as benzyl chloride or benzyl bromide or other organic halides such as thienylmethyl chloride.

The following example is illustrative of my invention.

Example

To a solution of 627 gms. (3.02 moles) of alpha-($\Delta^2$-cyclopentenyl)-2-thienylacetic acid in 1510 cc. of dry benzene, 395 gms. (3.32 moles) of thionyl chloride were added slowly, the mixture heated to boiling and refluxed for one hour. The solvent and excess thionyl chloride were removed under vacuum and the residue distilled at 3 mm. The fraction boiling at 114°–140° was collected, and redistilled at 2.7 mm., whereby 317 grams of pure alpha-($\Delta^2$-cyclopentenyl)-2-thienylacetyl chloride, B. P. 121–125°, $n_D^{20}$ 1.555 was obtained. Analysis gave the following results: Calculated for $C_{11}H_{11}ClOS$: C=58.29, H=4.89, Cl=15.65. Found: C=58.45, H=4.70, Cl=15.60.

20.2 gms. (0.089 moles) of alpha-($\Delta^2$-cyclopentenyl)-2 thienylacetyl chloride produced as above described in 120 cc. of dry benzene was then mixed with 11.83 gms. (0.089 mole) of 2-diethylaminoethyl mercaptan dissolved in 60 cc. of dry benzene and the mixture was refluxed for 4 hours. The solvent was removed under vacuum, the residue covered with ether and cooled to induce crystallization. The crystalline product was filtered, and washed with fresh ether. It was then decolorized by refluxing in 200 cc. of ethyl acetate for ½ hour with 3 gms. of activated carbon, the carbon then being removed by filtration and washed with 70 cc. of ethyl acetate. Addition of 40 cc. of ether to the combined ethyl acetate solutions and chilling induced crystallization of the desired product. These crystals were further purified by dissolving in 140 cc. of ethyl acetate, adding 20 cc. of Skellysolve B and chilling to promote crystallization; another such recrystallization followed by one from pure ethyl acetate gave 22.3 grams of pure 2-diethylaminoethyl alpha-($\Delta^2$-cyclopentenyl)-2-thienylthiolacetate hydrochloride, M. P. 108.5–111° C. Analysis gave the following results: Calculated for $C_{17}H_{26}ClNOS_2$: C=56.71, H=7.28, Cl=9.85. Found: C=56.44, H=7.34, Cl=9.96.

By substituting for the alpha-($\Delta^2$-cyclopentenyl)-2-thienylacetic acid in the above example, an equivalent amount of alpha-($\Delta^2$-cyclohexenyl)-2-thienylacetic acid, the compound 2-diethyl-aminoethyl alpha-($\Delta^2$-cyclohexenyl)-2-thienylthiolacetate hydrochloride was obtained. Other compounds within the scope of the present invention may be obtained by substituting suitable reactants in the procedure described in the above example. Such compounds include: 2 - (N - piperidino) - ethyl alpha-($\Delta^2$-cyclopentenyl)-2-thienylthiolacetate, 2-dithylaminoethyl alpha - ($\Delta^2$ - cyclopentenyl) -3-methyl-2-thienylthiolacetate, 2-diethylaminoethyl alpha-($\Delta^2$-cyclohexenyl)-4-chloro-2-thienylthiolacetate, 2-dimethylaminoethyl alpha-($\Delta^2$-cyclopentenyl)-2-thienylthiolacetate, 2-diisopropylaminoethyl alpha-($\Delta^2$-cyclohexenyl)-2-thienylthiolacetate, $\gamma$-diethylaminopropyl alpho-($\Delta^2$-cyclopentenyl)-2-thienylthiolacetate, 2-(N-morpholino)-ethyl alpha-($\Delta^2$-cyclopentenyl)-2-thienylthiolacetate, 2-(N - thiomorpholino)-ethyl alpha-($\Delta^2$-cyclohexenyl) - 2-thienylthiolacetate, 2-(N-piperazino)-ethyl alpha - ($\Delta^2$-cyclopentenyl)-2-thienylthiolacetate, as well as water soluble salts of these basic esters.

Since certain changes may be made in the compounds above described without departing from the scope of my invention, it is intended that all matter contained in the above description shall be interpreted as illustrative, and not in a limiting sense.

I claim:

1. A compound selected from the group consisting of compounds having the formula

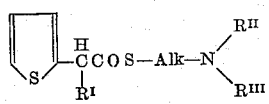

wherein $R^I$ is a member selected from the group consisting of cyclohexenyl and cyclopentenyl radicals; $R^{II}$ and $R^{III}$ are members selected from the group consisting of alkyl radicals containing from 1-3 carbon atoms and together with the nitrogen form cyclic members selected from the group consisting of piperidino, morpholino, thiomorpholino and piperazino radicals; and Alk denotes an alkenyl chain containing from 2-3 carbon atoms; and salts thereof.

2. The compound 2-diethylaminoethyl alpha-($\Delta^2$-cyclopentenyl)-2-thienylthiolacetate.

3. The compound 2-diethylaminoethyl alpha-($\Delta^2$-cyclohexenyl)-2-thienylthiolacetate.

4. The compound 2-(N-piperidino)-ethyl alpha-($\Delta^2$-cyclohexenyl)-2-thienylthioacetate.

References Cited in the file of this patent

UNITED STATES PATENTS

| Number | Name | Date |
|---|---|---|
| 2,390,555 | Richardson | Dec. 11, 1945 |
| 2,538,795 | Moffett | Jan. 23, 1951 |
| 2,541,634 | Blicke | Feb. 13, 1951 |
| 2,561,385 | Leonard | July 24, 1951 |
| 2,589,937 | Hafliger et al. | Mar. 18, 1952 |

FOREIGN PATENTS

| Number | Country | Date |
|---|---|---|
| 625,811 | Great Britain | July 5, 1949 |